(12) United States Patent
Jean et al.

(10) Patent No.: US 6,385,964 B2
(45) Date of Patent: May 14, 2002

(54) THRUST REVERSER HAVING A BYPASS VANE-CASCADE AND FITTED WITH A STATIONARY REAR STRUCTURE

(75) Inventors: Michel Christian Marie Jean, Montivilliers; Pascal Lardy, Le Havre; Laurent Marcel Vicogne, Rolleville, all of (FR)

(73) Assignee: Hispano-Suiza Aerostructures, Gonfreville l'Orcher (FR)

(*) Notice: Subject to any disclaimer, the term of this patent is extended or adjusted under 35 U.S.C. 154(b) by 0 days.

(21) Appl. No.: 09/769,529

(22) Filed: Jan. 26, 2001

(30) Foreign Application Priority Data

Jan. 27, 2000 (FR) .............................. 00 01022

(51) Int. Cl.$^7$ ................................. F02K 1/62
(52) U.S. Cl. ................... 60/226.2; 239/265.31; 239/265.29; 244/110 B
(58) Field of Search ................ 60/226.2, 230; 239/265.25, 265.27, 265.29, 265.31; 244/110 B

(56) References Cited

U.S. PATENT DOCUMENTS

| 3,691,771 A | 9/1972 | Colley |
| 3,779,010 A | 12/1973 | Chamay et al. |
| 3,815,357 A | 6/1974 | Brennan |
| 4,145,877 A | * 3/1979 | Montgomery .............. 60/226.2 |
| 4,147,029 A | 4/1979 | Sargisson |
| 4,698,964 A | 10/1987 | Glancy |
| 4,793,134 A | * 12/1988 | Coplin et al. .............. 60/226.2 |
| 4,801,112 A | 1/1989 | Fournier et al. |
| 4,960,243 A | 10/1990 | Dubois et al. |
| 5,054,285 A | 10/1991 | Geidel et al. |

FOREIGN PATENT DOCUMENTS

| GB | 1207938 | 10/1970 |
| GB | 1303875 | 1/1973 |

\* cited by examiner

*Primary Examiner*—Ted Kim
(74) *Attorney, Agent, or Firm*—Bacon & Thomas, PLLC

(57) ABSTRACT

A thrust reverser for a turbojet engine is provided with at least one displaceable assembly including a displaceable cowling portion and a flap. The displaceable cowling portion and the flap each subtend stationary upstream and downstream cowling portions such that the displaceable cowling portion forms a portion of the external engine cowling covering a reverse thrust opening and the flap forms a portion of the outer boundary of the gas flow in a forward thrust position. In a reverse thrust position, the reverse thrust opening is uncovered, and the displaceable cowling portion and the flap are displaced downstream such that the displaceable cowling portion extends downstream, parallel to the longitudinal engine axis and above, without interference, the downstream cowling portion. The flap engages in rolling contact with a plurality of rolling elements supported by an upstream end of the stationary downstream cowling portion and pivots and so as to block the gas flow duct and redirect the gas flow outward though the vane-cascades.

9 Claims, 18 Drawing Sheets

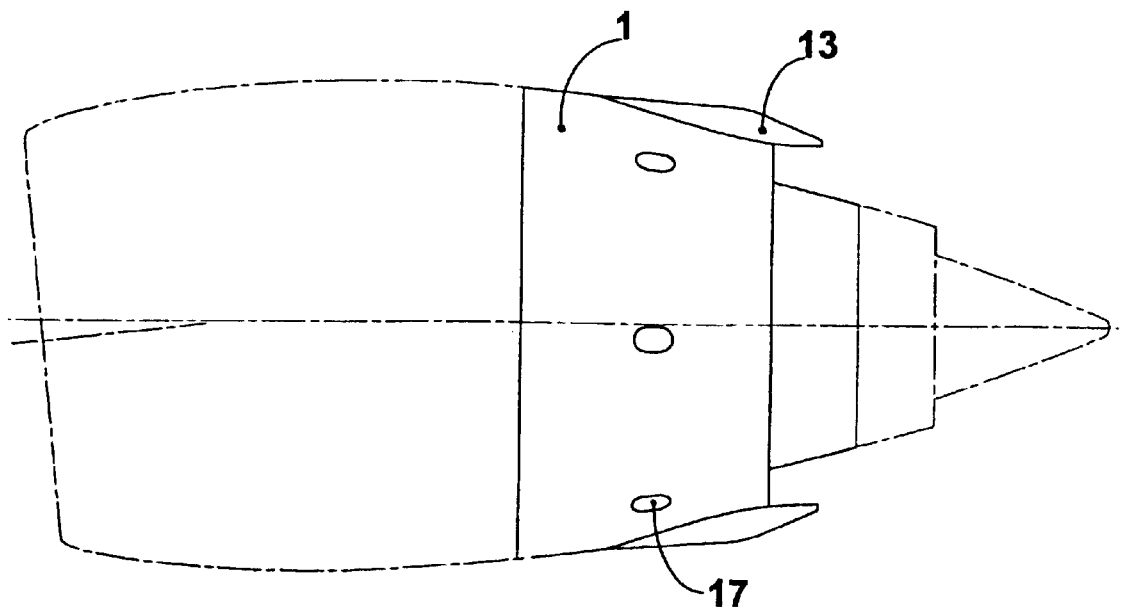
Fig : 1
PRIOR ART
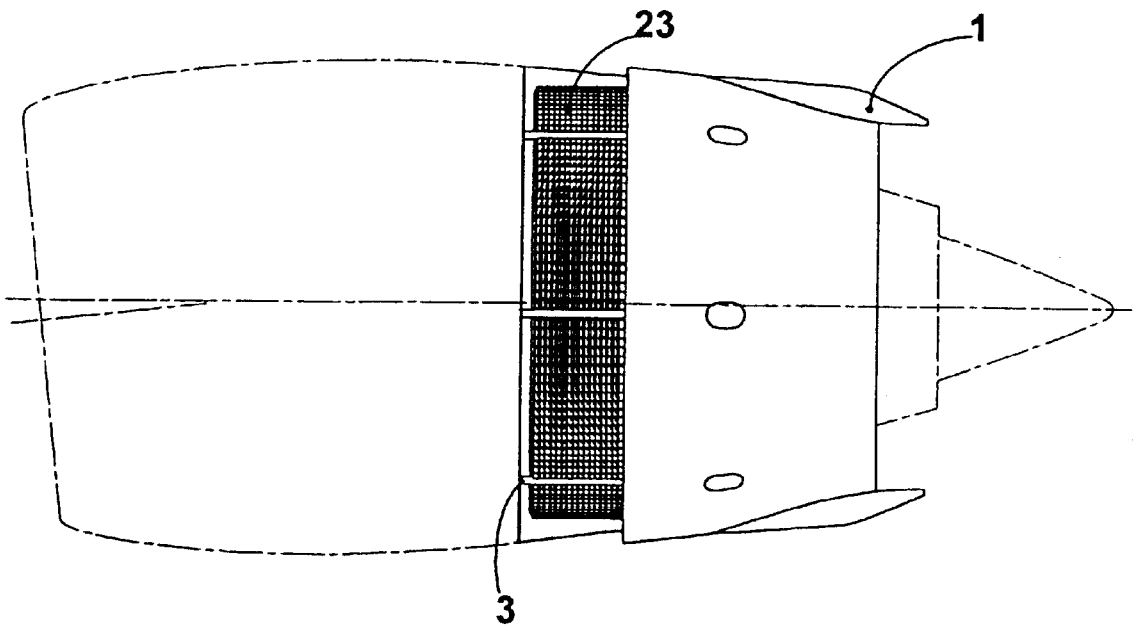
Fig : 2
PRIOR ART

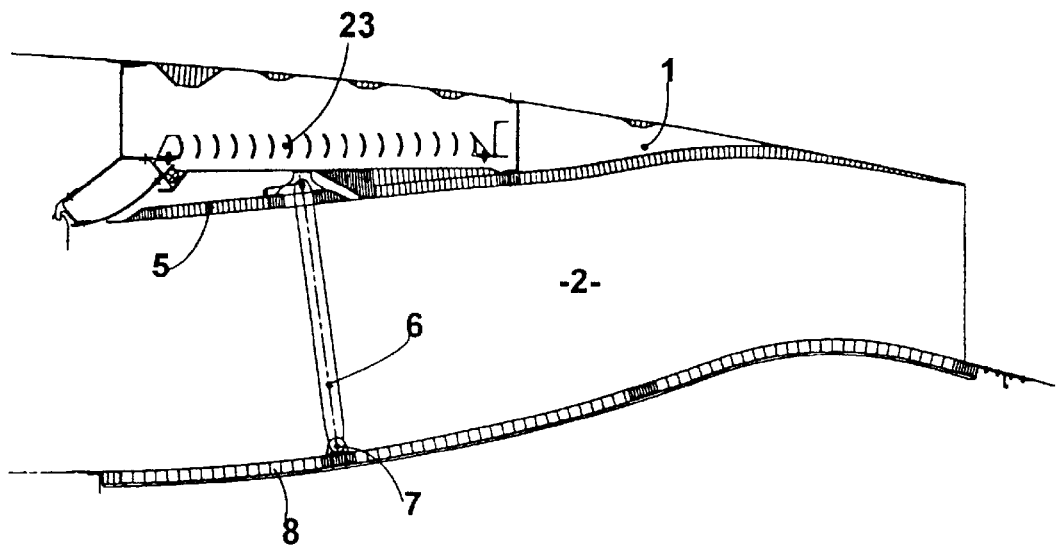
Fig : 3
PRIOR ART
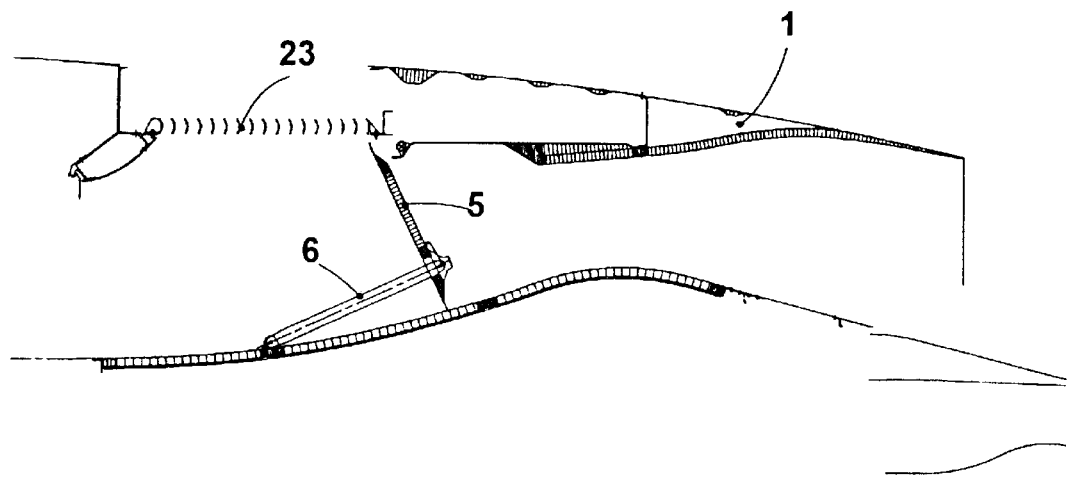
Fig : 4
PRIOR ART

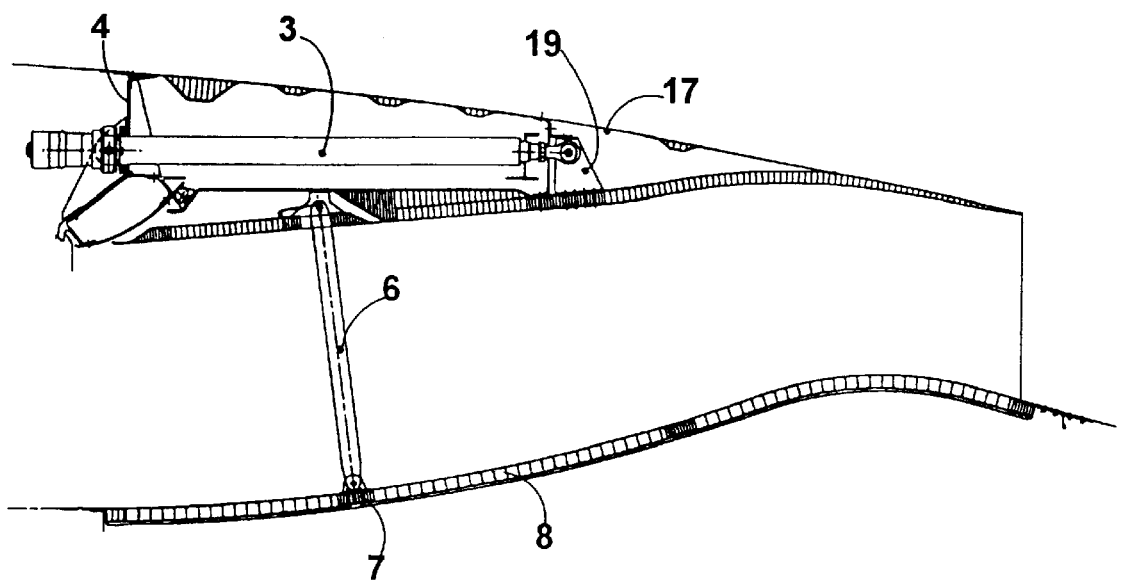
Fig : 5
PRIOR ART
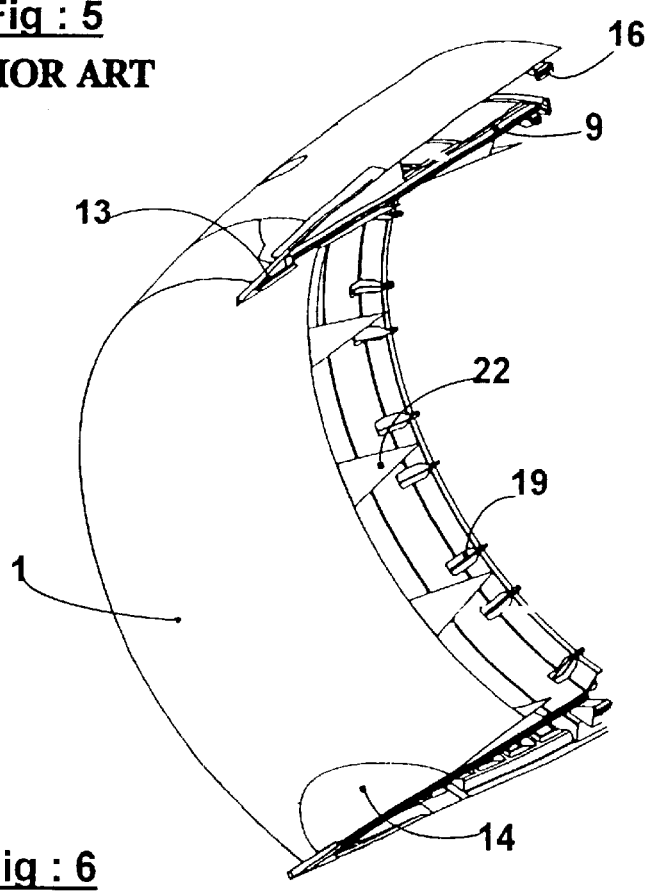
Fig : 6
PRIOR ART

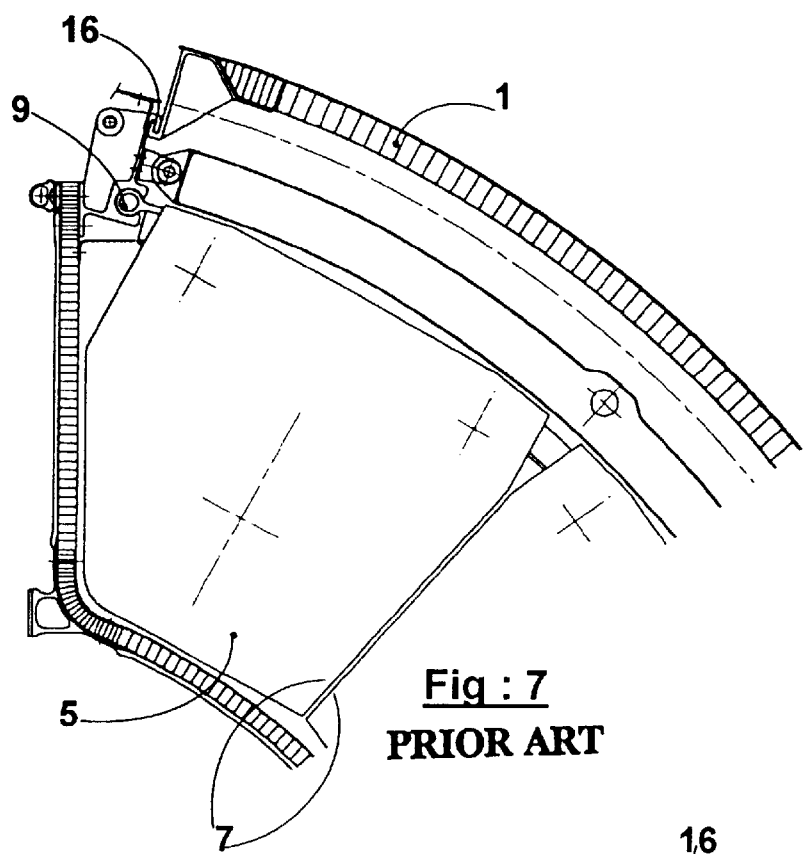
Fig : 7
PRIOR ART
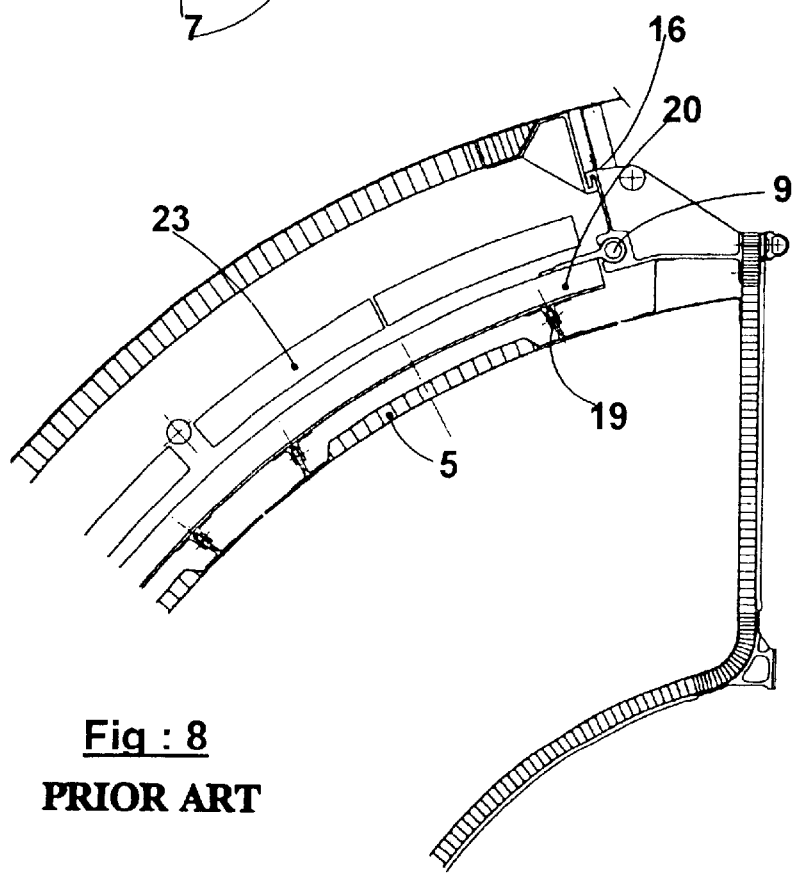
Fig : 8
PRIOR ART

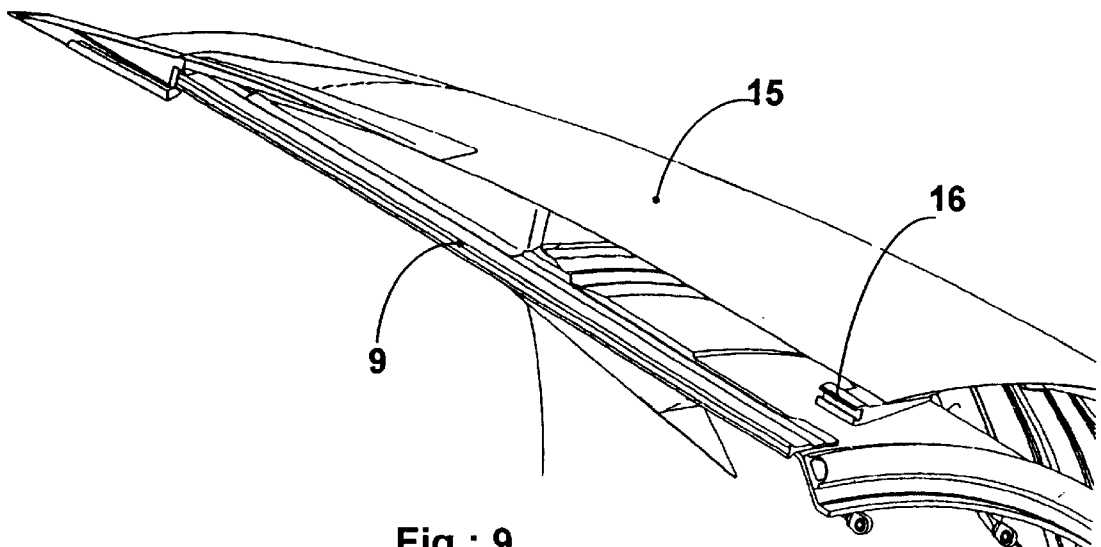
Fig : 9
PRIOR ART
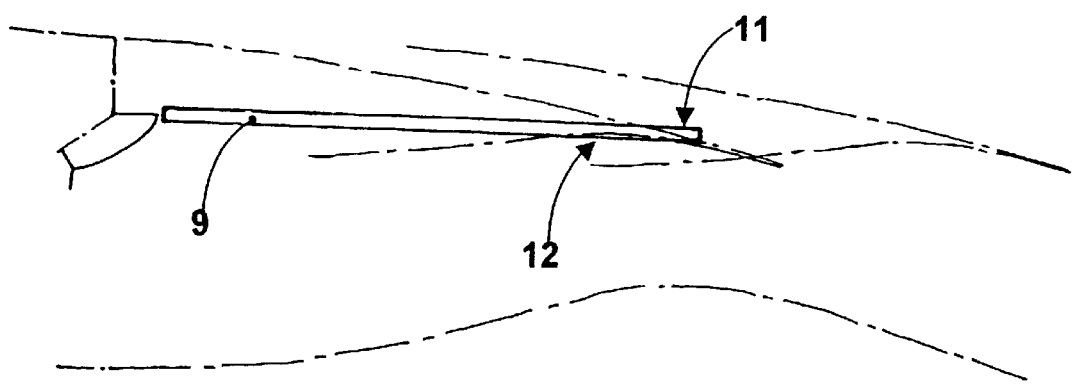
Fig : 10
PRIOR ART

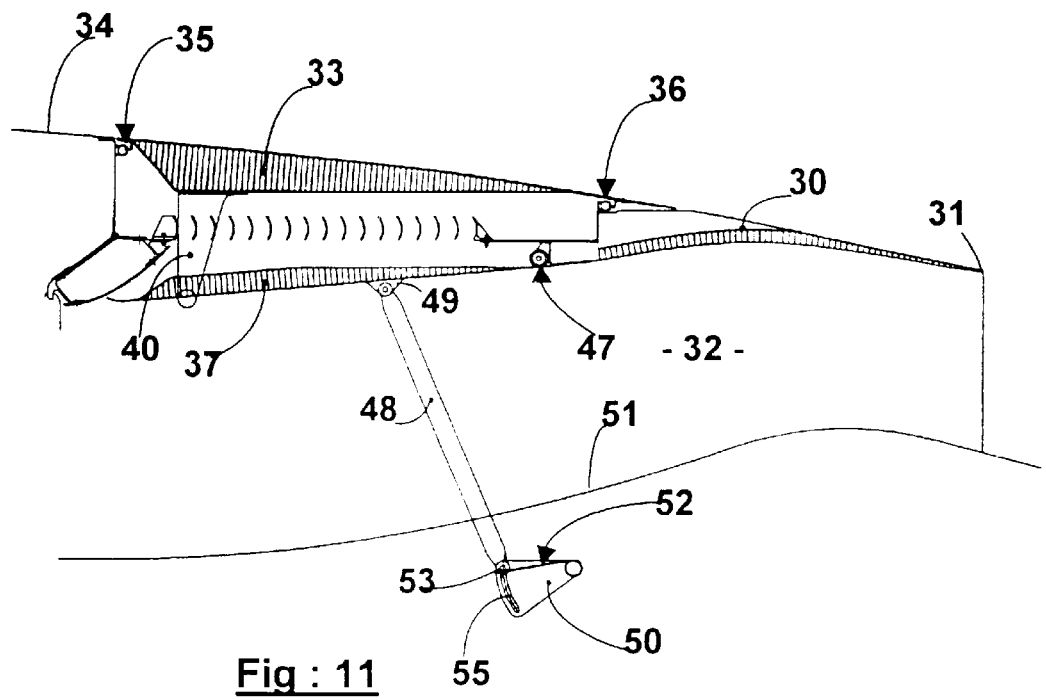
Fig : 11
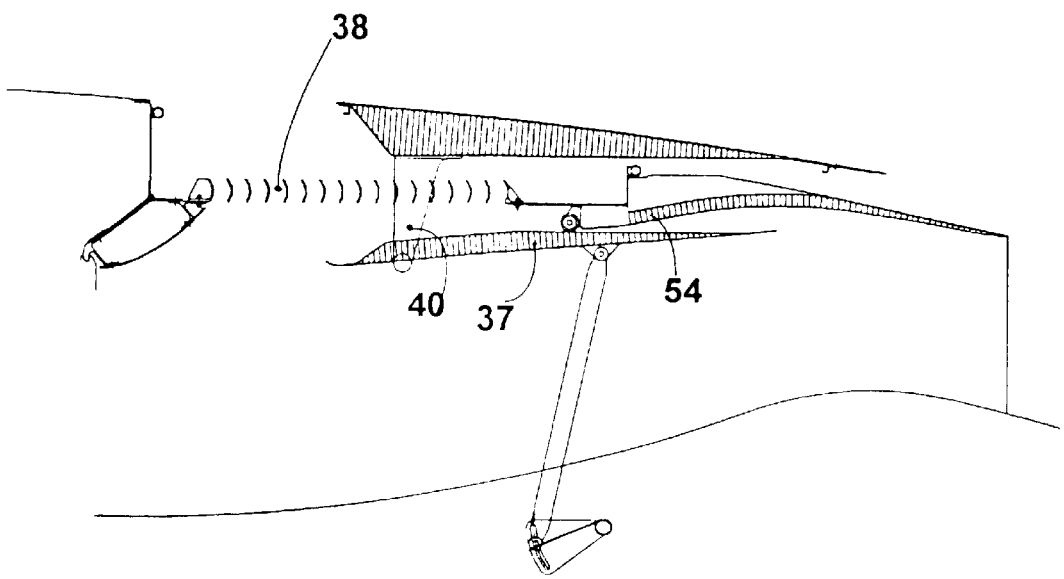
Fig : 12

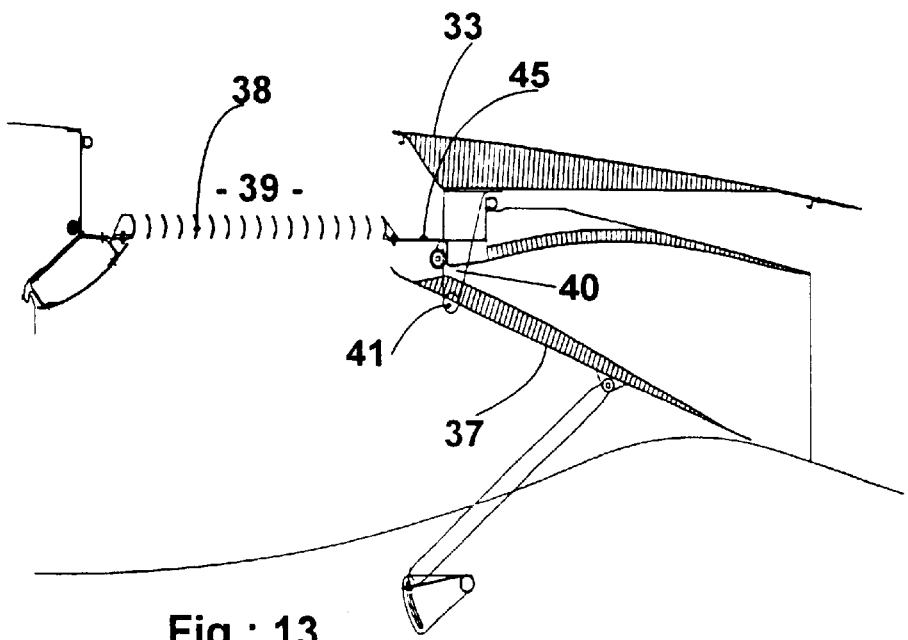
Fig : 13
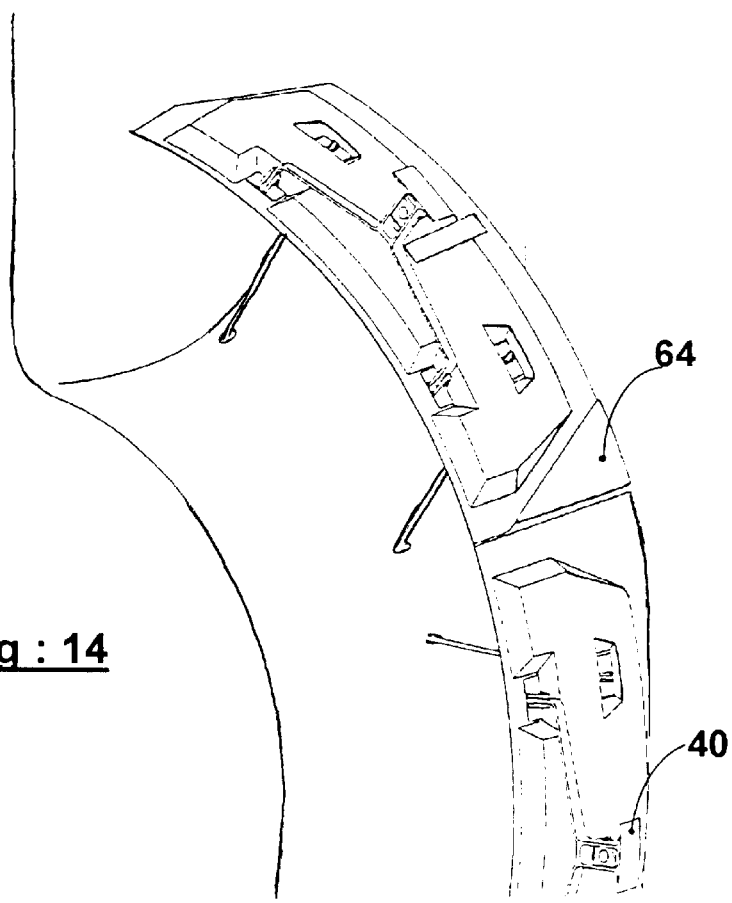
Fig : 14

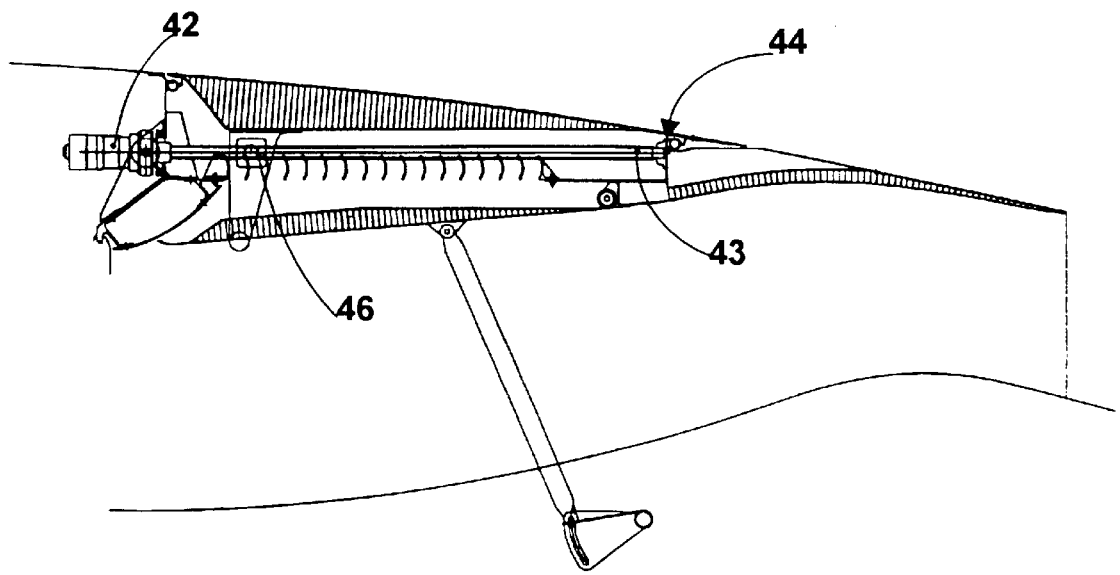
Fig : 15
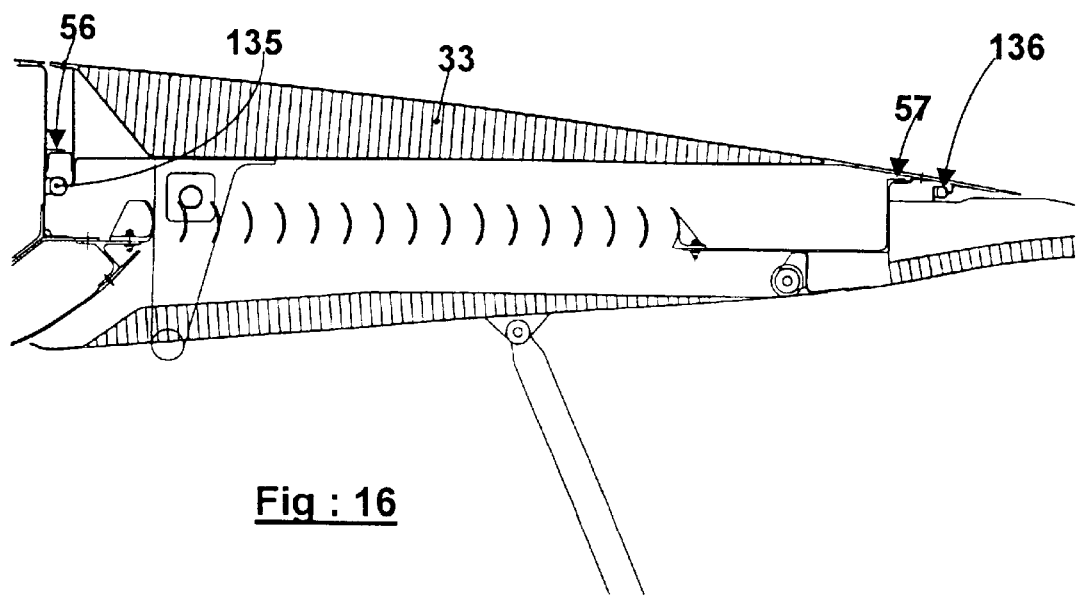
Fig : 16

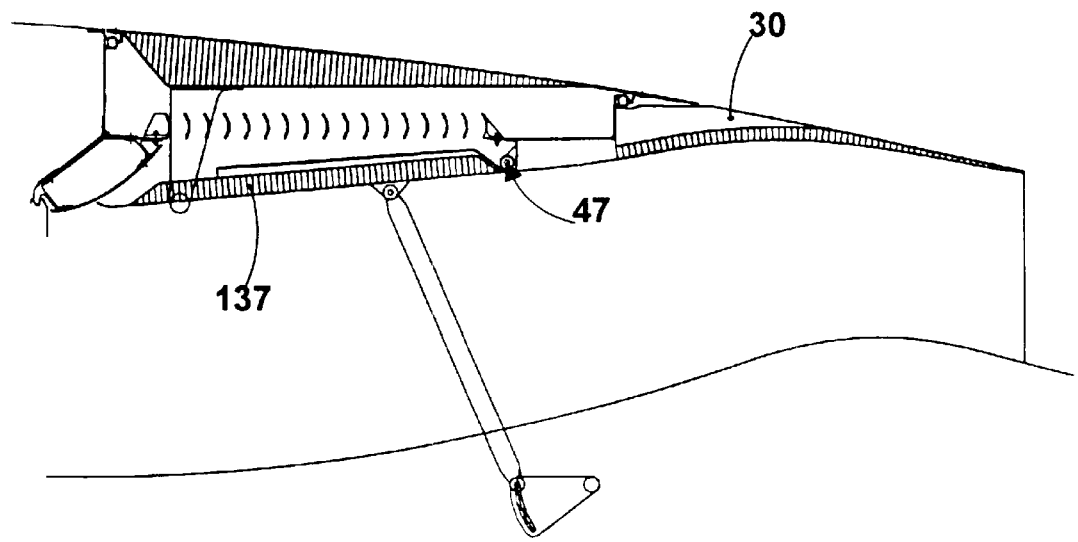
Fig : 17
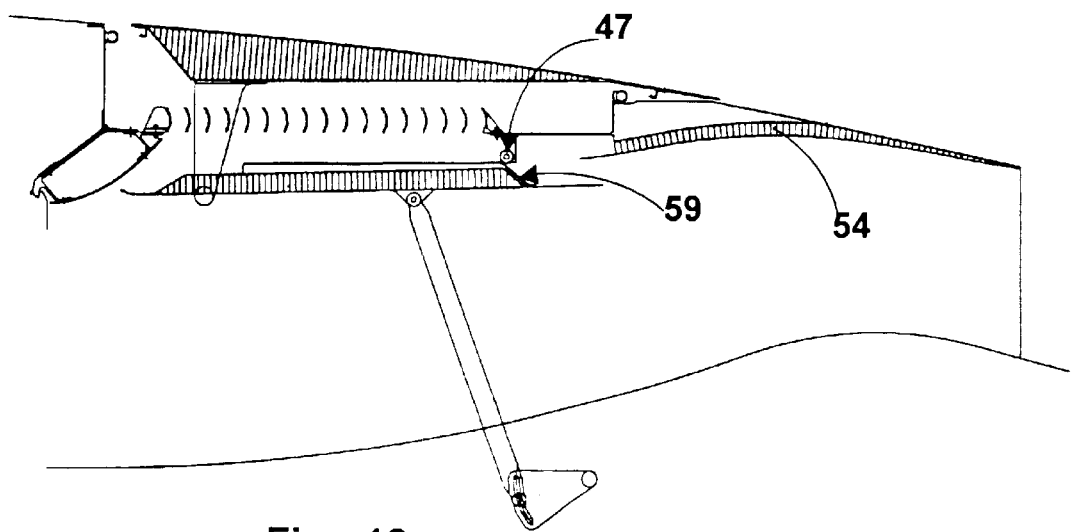
Fig : 18

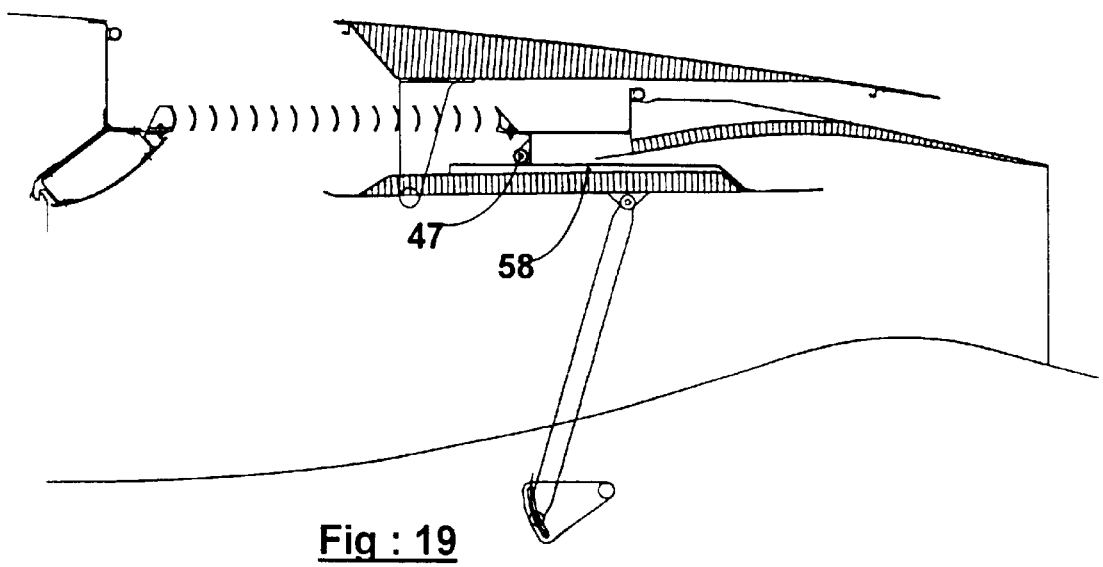
Fig : 19
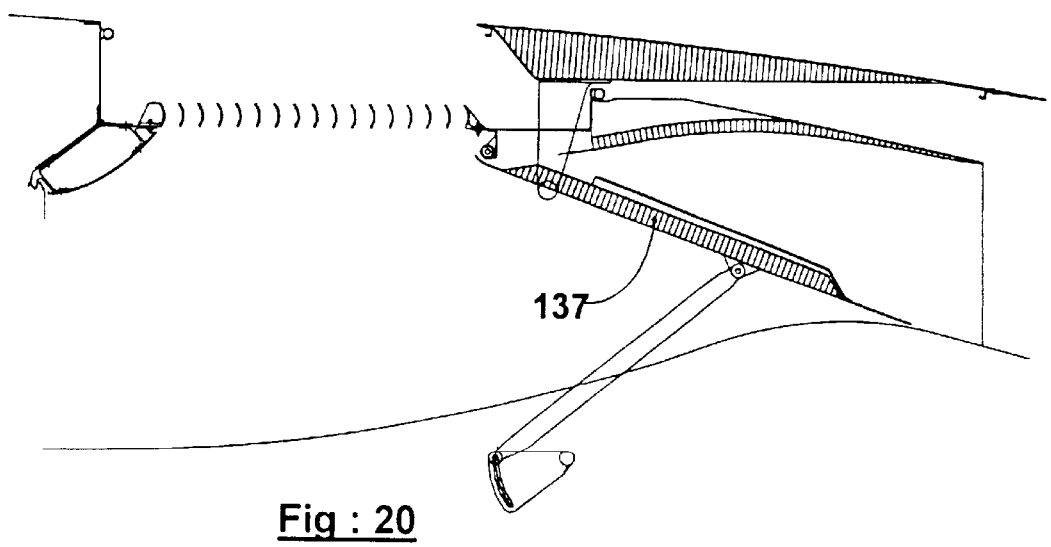
Fig : 20

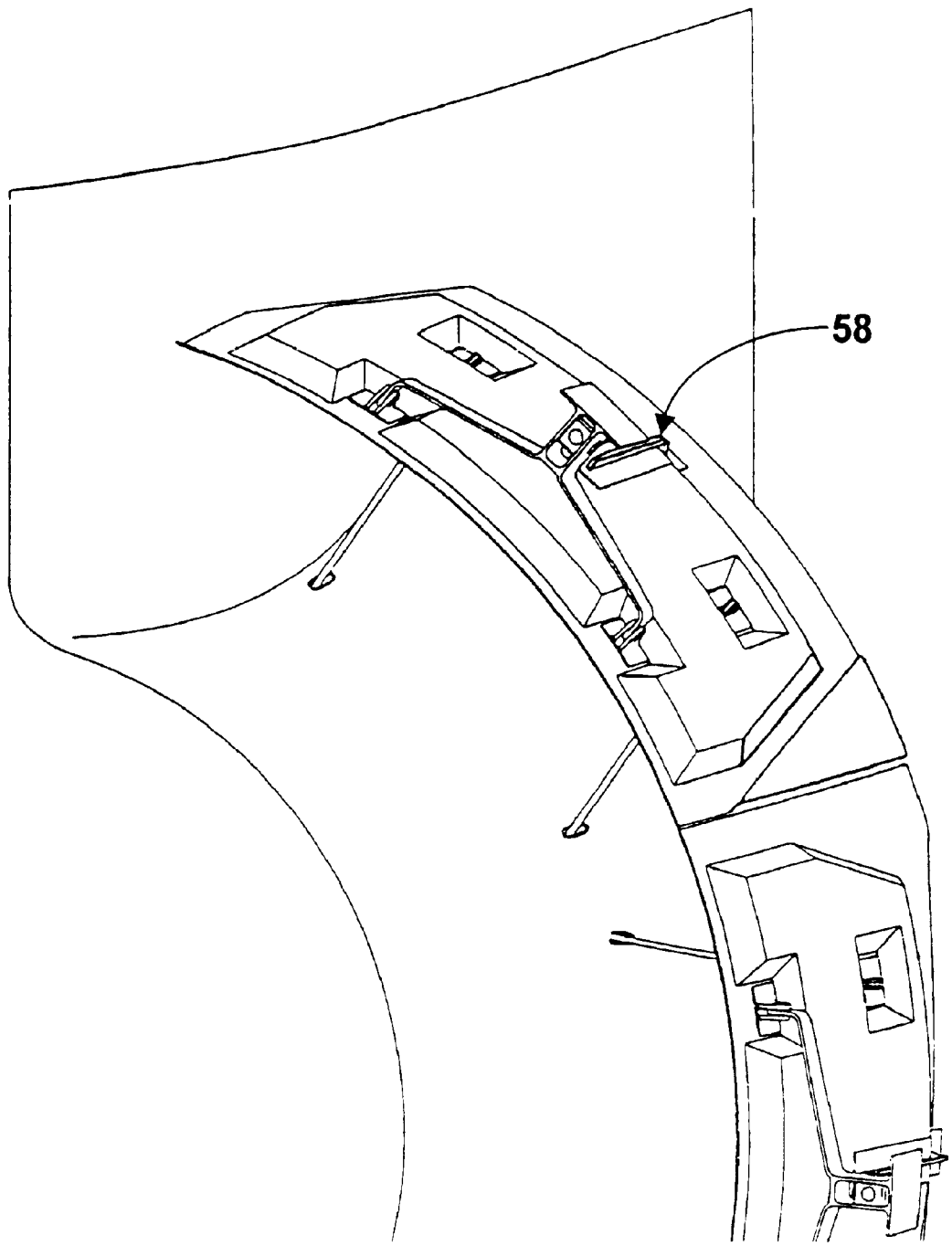
Fig : 21

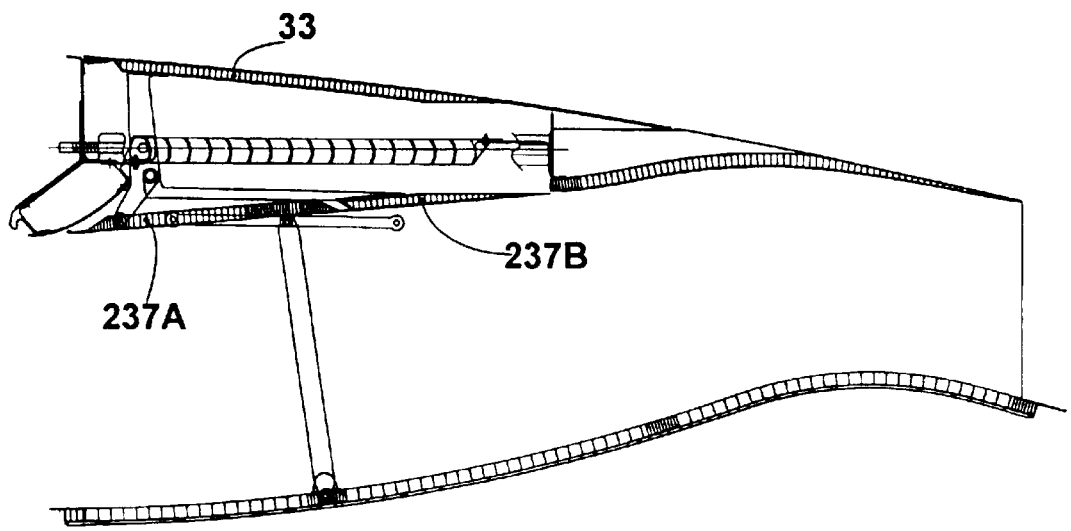
Fig : 22
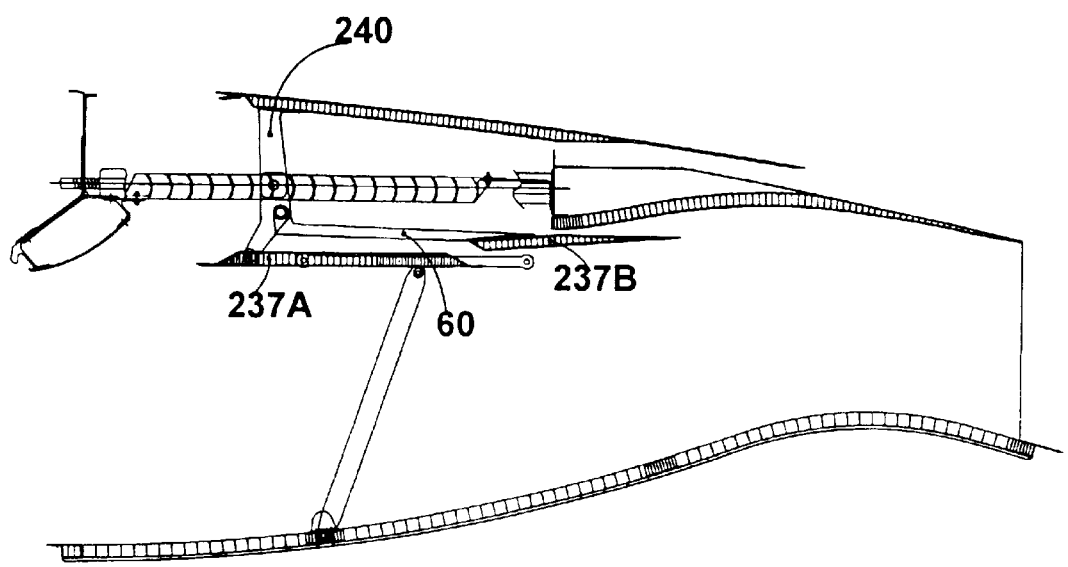
Fig : 23

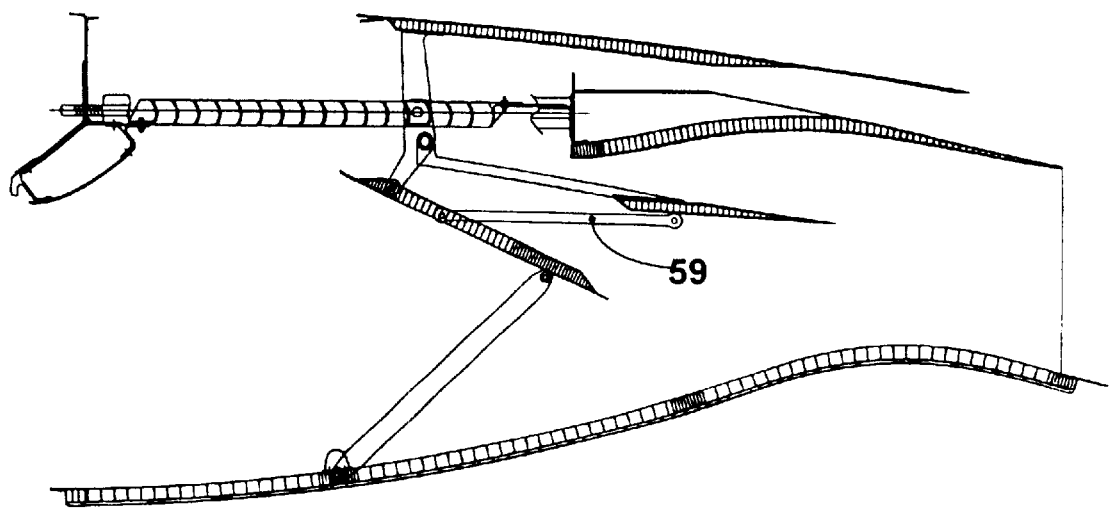
Fig: 24
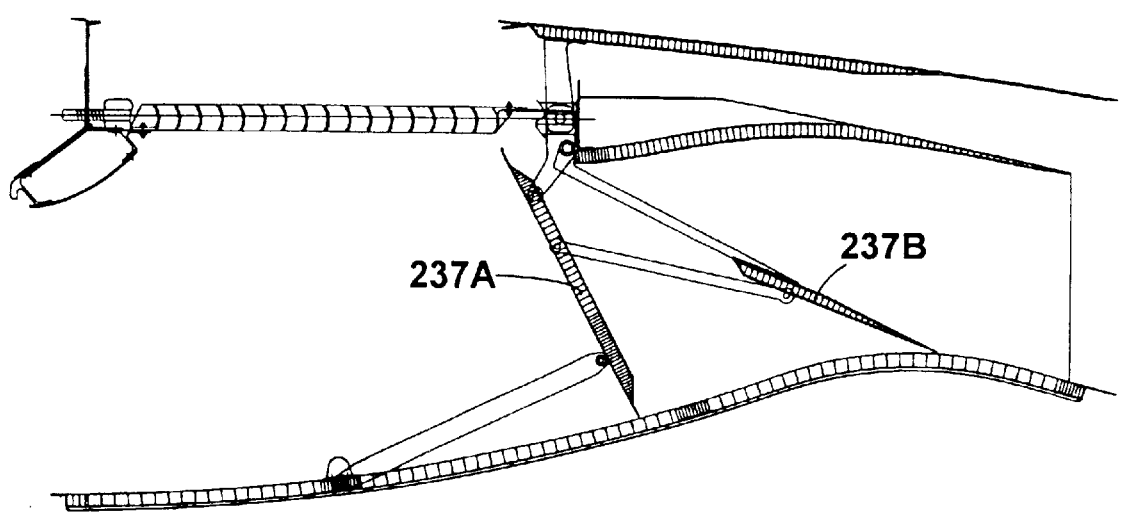
Fig: 25

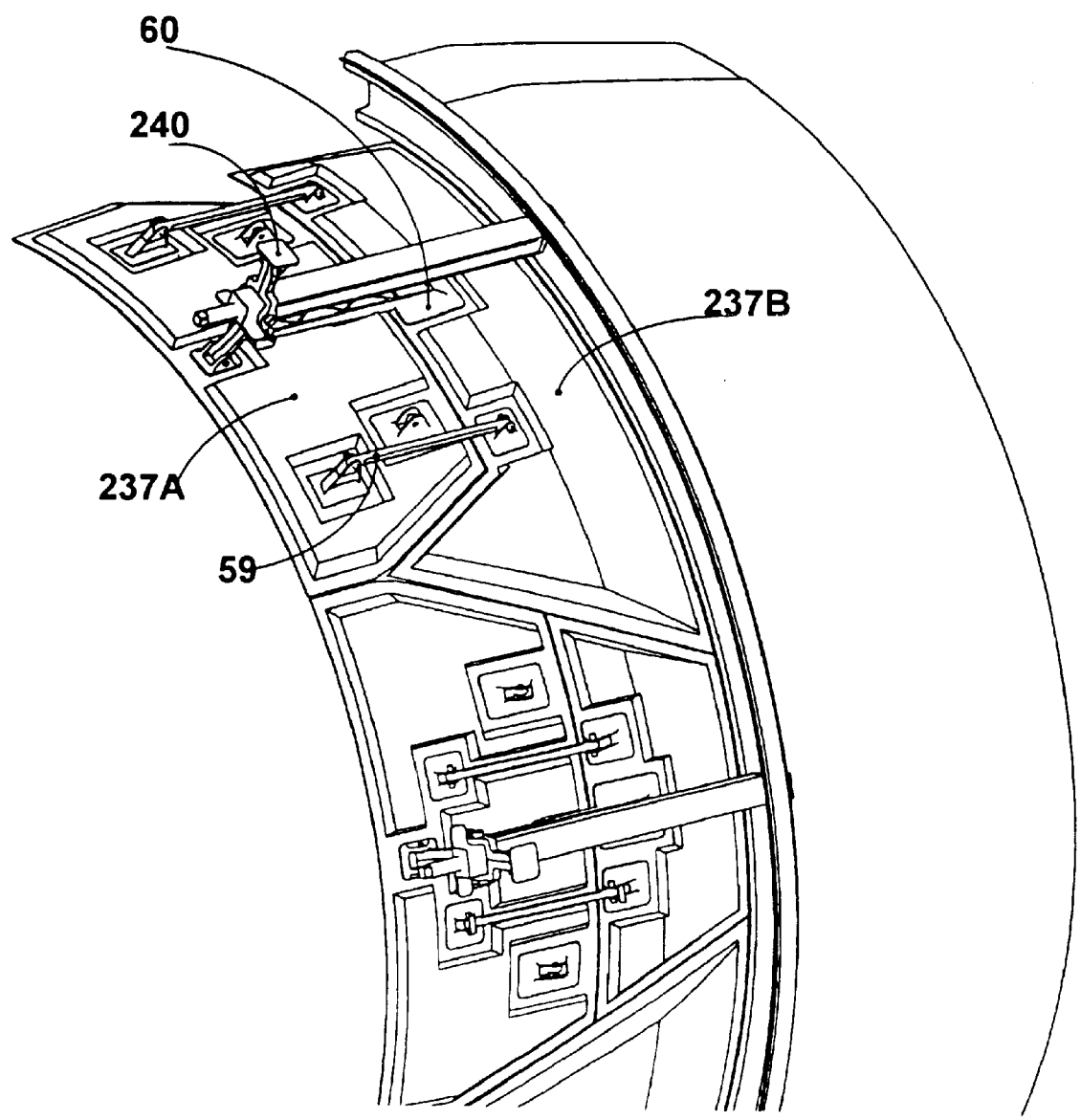
Fig : 26

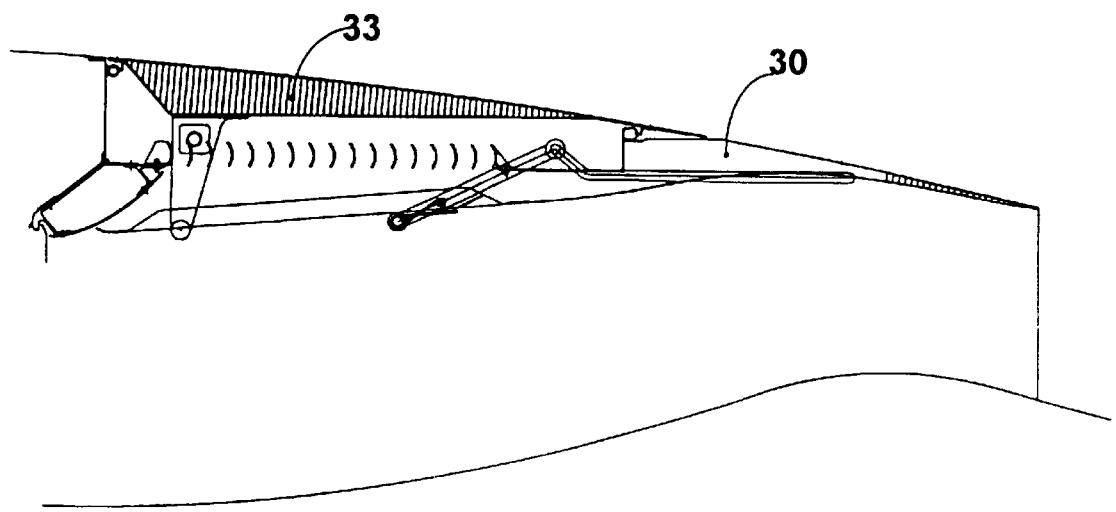
Fig : 27
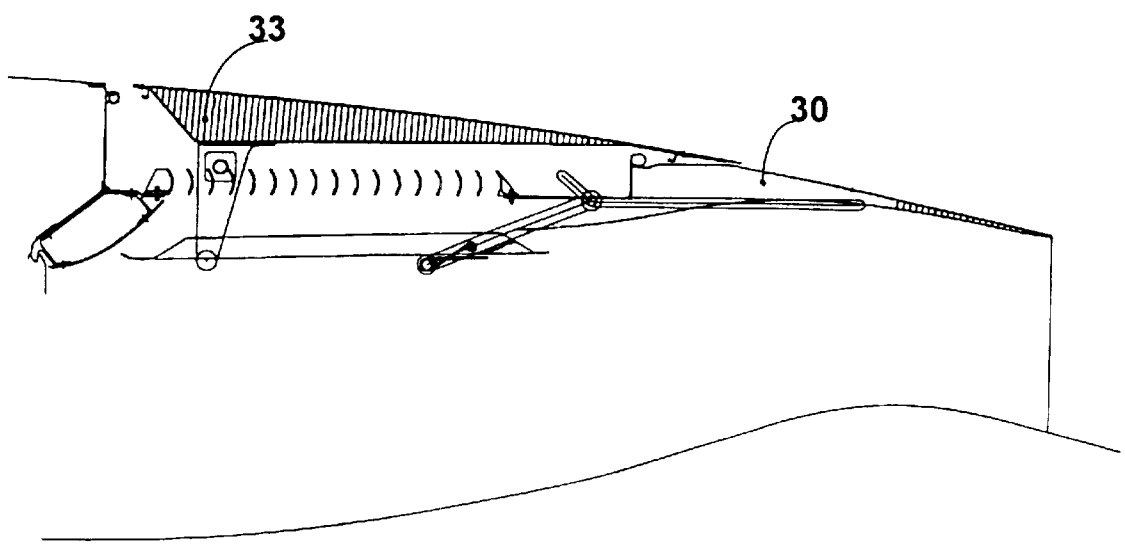
Fig : 28

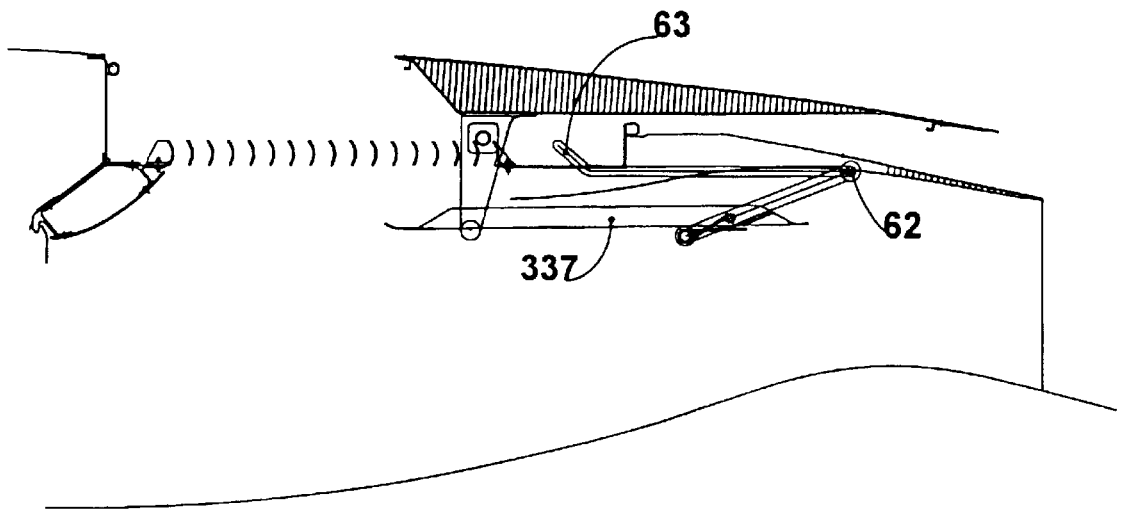
Fig : 29
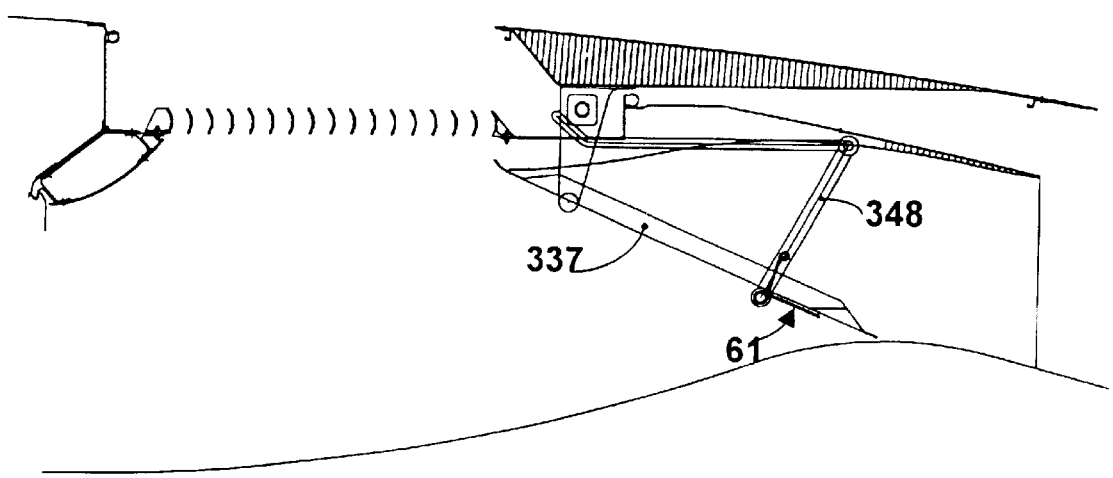
Fig : 30

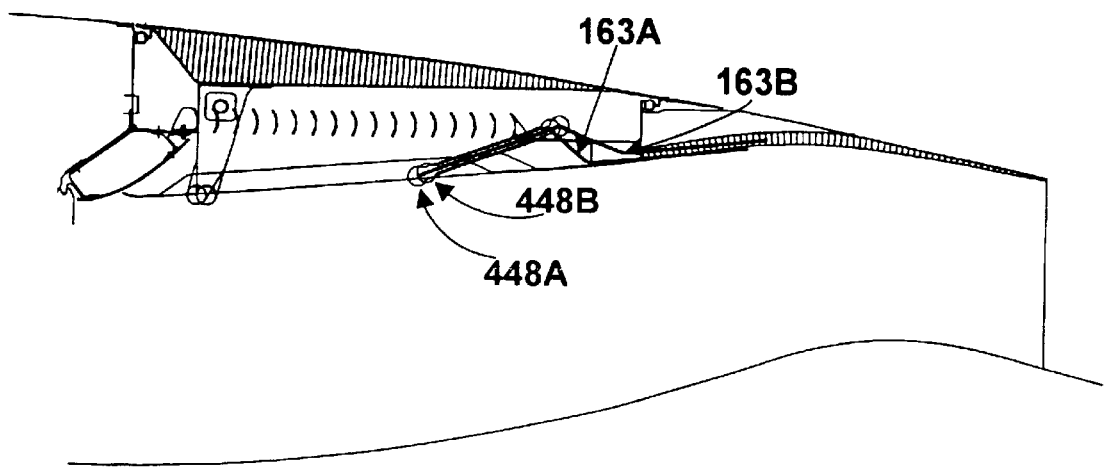
Fig : 31
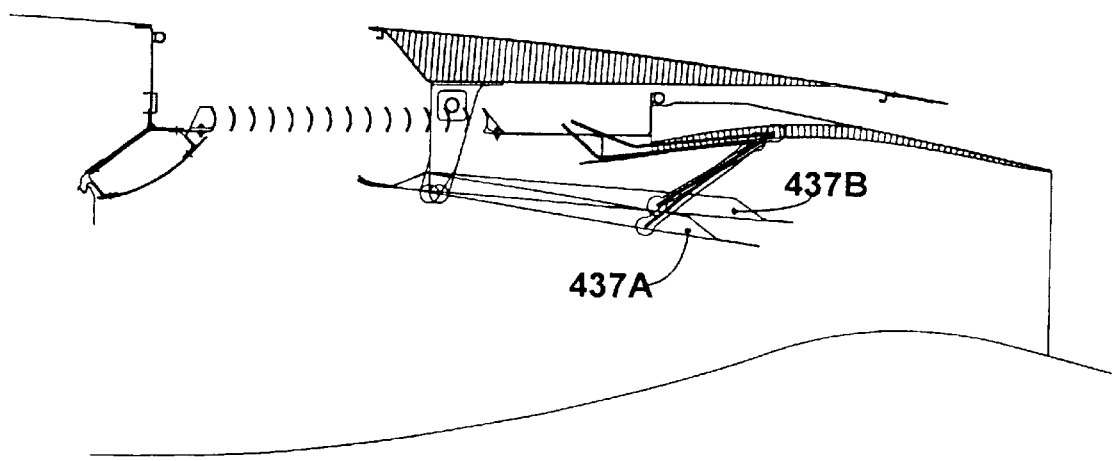
Fig : 32

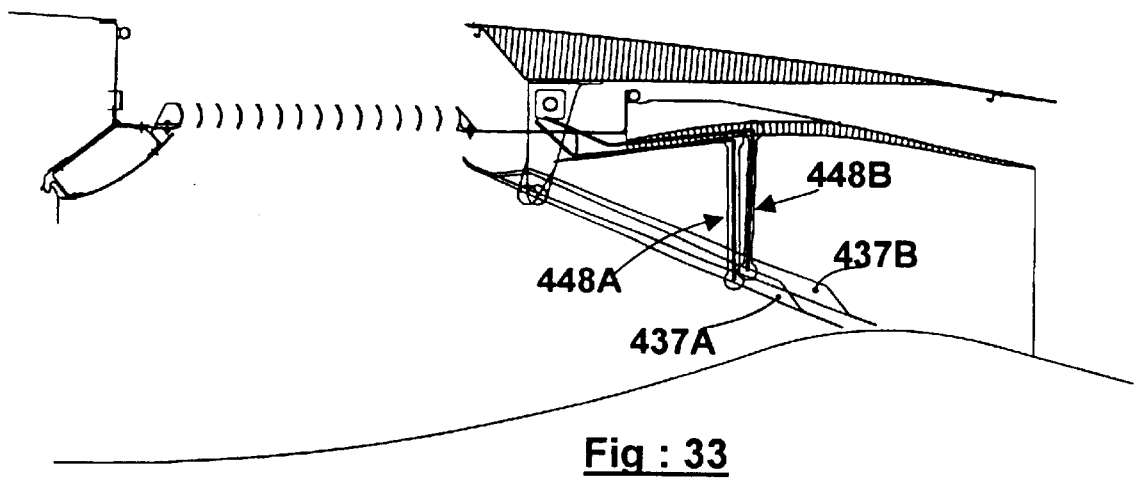
Fig : 33
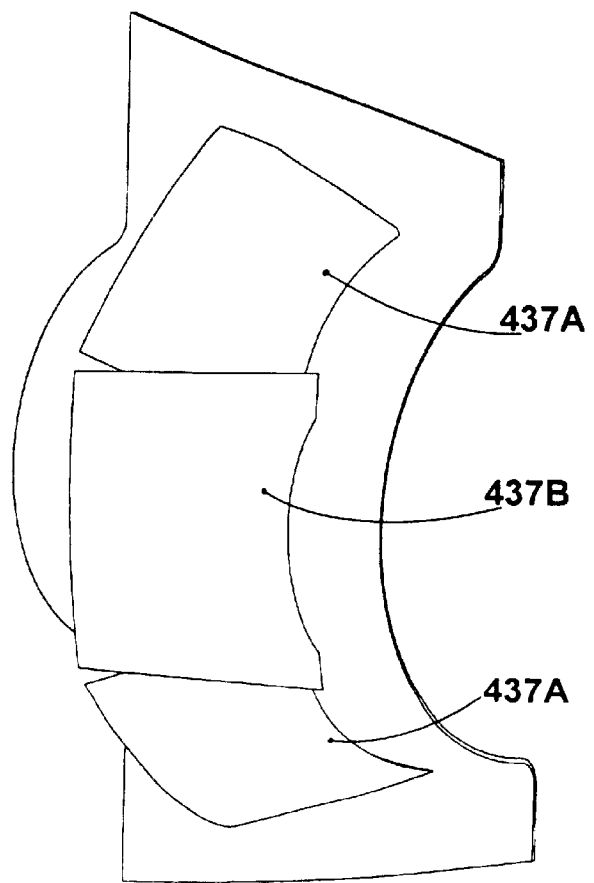
Fig : 34

THRUST REVERSER HAVING A BYPASS VANE-CASCADE AND FITTED WITH A STATIONARY REAR STRUCTURE

BACKGROUND OF THE INVENTION

1. Field of the Invention

The present invention relates to a thrust reverser for a turbofan-type engine in which a pivotable flap redirects the direction of the flow of gases passing through an annular duct to provide thrust reversing forces. More particularly, the present invention relates to a thrust reverser having a displaceable assembly including a displaceable cowling portion that forms a portion of an external fan cowling in a forward thrust position and extends downstream, parallel to the engine axis so as to form an opening in the external fan cowling in a reverse thrust position, and a pivotable flap that forms a portion of the outer boundary of the gas flow duct in a forward thrust position, and cooperates with the displaceable cowling portion and pivots so as to deflect the gas flow through the external cowling opening in a reverse thrust position.

2. Related Art

Turbofan-type turbojet engines are well-known in the art and comprise an annular duct to the rear of the fan for the purpose of channeling the so-called cold, bypass flow. This annular duct is bounded on the inside by the engine cowling and on the outside by a fan cowling. The annular duct may channel both the bypass flow and the primary exhaust gas flow at a downstream portion, or may channel only the bypass flow. It is known to provide one or more pivotable flaps in the annular duct to redirect the cold flow gas laterally outwardly through a lateral opening in the cowling.

FIGS. 1 through 10 show a known pivoting door-type thrust reverser associated with the fan cowling of a turbofan-type engine.

As illustrated in FIGS. 3 and 4, the thrust reverser is a so-called vane-cascade reverser wherein a displaceable assembly 1 in a forward-thrust position comprises a portion of the outer boundary of the annular duct 2 that channels the bypass flow. In a reverse thrust position, the thrust reverser door is axially displaceable in the downstream direction by a control system comprising a set of linear actuators 3 which are affixed on the upstream portion 4 of the thrust reverser. As shown in FIGS. 2 and 4, the downstream displacement of the displaceable assembly 1 entails pivoting a plurality of flaps 5 which are arranged to seal the duct and deflect the gas flow, thus providing a reverse flow which is guided by a cascade of vanes 23 configured on the external periphery of the duct and exposed to the deflected gas flow in a reverse thrust position.

The known designs of such a turbojet-engine thrust reverser comprise two parts, each part comprising a semi-cylindrical segment of the displaceable assembly 1 and driven, by linear actuators 3. The pivoting motion of flaps 5 are guided by linkrods 6 about a fixed linkrod hinge point 7 which is arranged on the inside wall 8 of the bypass duct.

European patent document 0 109 219 A and U.S. Pat. No. 3,500,645 illustrate typical known thrust reversers. Such known designs of thrust reversers have led to a number of inadequately resolved problems. For example, the attempts to reduce weight affect the rigidity of the displaceable assembly 1. As a result, the exhaust cross-section may become aerodynamically unstable.

As illustrated in FIGS. 6–10, displacement of the displaceable assembly 1 requires that the primary rails 9, of which the lengths protrude beyond the pod lines in the external and internal zones 11 and 12 respectively shown in FIG. 10 be smoothed by either external fairings 13 or by internal fairings 14. Moreover, secondary rails 16 are required for guidance and structural reinforcement of the external flap 15 of the displaceable assembly 1. The displaceable assembly 1 is arranged with bays 17 to access the linear actuators 3. The force exerted by the linear actuators 3 is applied to fittings 19 situated at the rear portion of the displaceable assembly 1.

As shown in FIGS. 6–8, the flaps 5 hinge on fittings 19 resting on the internal panel 20 of the displaceable assembly 1. The flaps 5 exhibit a contour that follows the routings 21 so they will not interfere in the thrust-reversal mode. However, flap corners 22 are required to fill the gaps that arise in the forward-thrust position.

SUMMARY OF THE INVENTION

The object of this invention are to eliminate the drawbacks of the known prior solutions of thrust reversers provided with the conventional above cited vane cascades while providing simplified manufacture, weight reduction and improvement of aerodynamic performance.

The present invention realizes the objective by providing a thrust reverser of the type cited above wherein in a forward thrust position, a displaceable cowling portion and a flap, belonging to at least one displaceable assembly, each subtend the upstream and downstream cowling portions such that the displaceable cowling portion forms a portion of the external fan cowling covering a reverse thrust opening and the flap forms a portion of the outer boundary of the gas flow. In a reverse thrust position, the reverse thrust opening is uncovered, and the displaceable cowling portion and the flap are displaced downstream such that the displaceable cowling portion extends downstream, parallel to the longitudinal engine axis and above, without interference, the downstream cowling portion. The flap engages in rolling contact with a plurality of rolling elements supported by an upstream end of the stationary downstream cowling portion and pivots and so as to block the gas flow duct and redirect the gas flow outward through the vane-cascades.

Several supplementary design configurations relate to driving the flaps.

BRIEF DESCRIPTION OF THE DRAWINGS

FIG. 1 is an external view of a turbofan-type engine arranged with a thrust reverser in a forward-thrust position;

FIG. 2 is an external view of a turbofan-type engine arranged with a thrust reverser in a reverse thrust position;

FIG. 3 is a partial, longitudinal, cross-sectional view illustrating a thrust reverser in a forward thrust position;

FIG. 4 is a partial, longitudinal cross-sectional view illustrating a thrust reverser in a reverse thrust position;

FIG. 5 is a partial, longitudinal cross-sectional view illustrating a thrust reverser in a forward thrust position having a displacement-driving linear actuator;

FIG. 6 is a perspective view of the displacement assembly of the thrust reverser shown in FIGS. 1–5;

FIG. 7 is a perspective view of the thrust reverser in the reverse thrust position in a so-called 12 o'clock zone;

FIG. 8 is a perspective view of the thrust reverser of FIG. 7 in the forward-thrust position in the so-called 12 o'clock zone;

FIG. 9 is a perspective view of the displaceable assembly shown in FIG. 6 in the so-called 12 o'clock zone;

FIG. 10 is a diagrammatic detail view of FIG. 3 showing the position of a primary rail of the thrust reverser;

FIG. 11 is a partial, longitudinal, cross-sectional view illustrating the thrust reverser of the present invention in the forward-thrust position;

FIG. 12 shows the thrust reverser of FIG. 11 moving between the forward thrust and reverse thrust positions;

FIG. 13 shows the thrust reverser of FIG. 11 in the reverse thrust position;

FIG. 14 is a partial perspective view of the thrust reverse of FIG. 11 showing the flaps when the displaceable assembly is retracted;

FIG. 15 shows the thrust reverser of FIG. 11 arranged with a flap-driving system;

FIG. 16 is a view similar to that of FIG. 11 arranged with a variation of the thrust reverser of the invention;

FIG. 17 is a partial, longitudinal, cross-sectional view of the present invention illustrating a variation of the flap-driving system;

FIG. 18 shows the thrust reverser of FIG. 17 illustrating the movement of the displaceable assembly from a forward thrust position to a reverse thrust position at a beginning stage;

FIG. 19 shows the thrust reverser of FIG. 17 illustrating the movement of the displaceable assembly from a forward thrust position to a reverse thrust position at an intermediate stage;

FIG. 20 shows the thrust reverser of FIG. 17 illustrating the movement of the displaceable assembly in a reverse thrust position;

FIG. 21 is a partial perspective view of the trust reverser of FIG. 17 showing the flaps when the displaceable assembly is retracted;

FIG. 22 is a partial, longitudinal, cross-sectional view illustrating the present invention having segment flaps.

FIG. 23 shows the thrust reverser of FIG. 22 illustrating the movement of the displaceable assembly from a forward thrust position to a reverse thrust position at a beginning stage;

FIG. 24 shows the thrust reverser of FIG. 22 illustrating the movement of the displaceable assembly from a forward thrust position to a reverse thrust position at an intermediate stage;

FIG. 25 shows the thrust reverser of FIG. 22 illustrating the movement of the displaceable assembly in a reverse thrust position;

FIG. 26 is a partial perspective view of the thrust reverser of FIG. 22 showing the flaps when the displaceable assembly is retracted;

FIG. 27 is a partial longitudinal, cross-sectional view illustrating the present invention illustrating a variation of the flap driving system;

FIG. 28 shows the thrust reverser of FIG. 27 illustrating the movement of the displaceable assembly from a forward thrust position to a reverse thrust position at a beginning stage;

FIG. 29 shows the thrust reverser of FIG. 27 illustrating the movement of the displaceable assembly from a forward thrust position to a reverse thrust position at an intermediate stage;

FIG. 30 shows the thrust reverser of FIG. 27 illustrating the movement of the displaceable assembly in a reverse thrust position;

FIG. 31 is a partial, longitudinal, cross-sectional view illustrating the present invention illustrating another embodiment variation of the flap-driving system;

FIG. 32 shows the thrust reverser of FIG. 31 illustrating the movement of the displaceable assembly from a forward thrust position to a reverse thrust position at an intermediate stage;

FIG. 33 shows the thrust reverse of FIG. 31 illustrating the movement of the displaceable assembly in a reverse thrust position;

FIG. 34 is a perspective view of the thrust reverser of FIG. 31 illustrating the positions of the flaps in the reverse thrust position.

DETAILED DESCRIPTION OF THE PREFERRED EMBODIMENTS

In one embodiment of the invention shown in FIGS. 11–15, a thrust reverser operates on the general principle of a known, bypass, cascaded-vane reverser as described above in relation to FIGS. 1–10. The thrust reverser of the present invention comprises a stationary downstream cowling portion 30 that during the forward-thrust operation forms the downstream end 31 of the outside wall of the annular duct 32 through which moves the bypass flow. In this manner the outer displaceable structure is a displaceable cowling portion 33 which, in the forward thrust position, joins the stationary upstream cowling portion 34 of the thrust reverser and at the rear joins the downstream cowling portion 30, the front and rear seals 35 and 36 resp. being appropriately inserted.

As illustrated in FIG. 13, the flap 37 in a reverse thrust position pivots to block the annular duct 32, while vane cascades 38 deflect the flow forward through the reversal opening 30 which is open after the displaceable cowl 33 has been extended rearward.

Compared with the known prior art illustrated in FIGS. 1–10, the present invention eliminates the secondary rails 16. Short rails are used to displace the displaceable cowling portion 33, and are affixed on beams of the stationary structure in the so-called 12 and 6 o'clock zones. Moreover the flap corners 22 are also eliminated. In an embodiment shown by FIG. 14, every second flap 37 is arranged with a notched, downstream corner 64 so as to prevent interference with other components during thrust-reversal operation. The flaps 37 hinge on fittings 40 linked to the displaceable cowling portion 33. Each flap 37 pivots about a pivot shaft 41 supported by each fitting 40.

As shown in FIGS. 14 and 15, the motion of the displaceable cowling portion 33 is controlled by a linear actuator 42 driving a shaft 43 resting in a rear bearing 44 supported on a rear cascade frame 45. The shaft 43 drives a nut 46 linked to the fitting 40 supporting the flaps 37. The fitting 40 moves between two vane cascades 38 during opening, and, at the end of the travel, in a slot of the rear cascade frame 45. The rear, stationary thrust-reverser structure supports two rollers 47 resting against the flaps 37 while moving. The motion is guided by linkrods 48 hinging at the foot fittings on brackets 49 resting on the flaps 37 and at the other end on stationary fittings 50 resting on the inner wall 51 of the bypass duct 32. A spring 52 resting on the shaft 53 of the foot of the linkrod 48 biases the flap 37 toward the stationary thrust-reverser structure into the closed position of the forward-thrust position as shown in FIG. 11. As shown by FIG. 14, the foot fittings 50 and the brackets 49 of the linkrod heads are no longer within the flow path and therefore minimize aerodynamic losses.

Two stages encompass the transition between forward-thrust operation as shown in FIG. 11 and the reverse thrust position operation shown in FIG. 13. In the beginning stage shown in FIG. 12, the displaceable cowling portion 33 and the flaps 37 are driven rearward by the linear actuators 42. The action exerted by the rollers 47 on the flaps 37 prevents interference between these flaps 37 and the inner panel 54 of the stationary, downstream cowling portion 30. Each flap 37 is pressed against the rollers 47 due to the action of the springs 52 transmitted by linkrods 48. The shaft 53 at the foot of the linkrod moves within the oblong slot 55 of the stationary fitting 50.

On account of this design, the flow path is blocked to flow until there is an adequate opening of the reversal well.

In the intermediate stage, when the linkrod-foot shaft 53 comes to a stop in the oblong slot 55 of the stationary fitting 50, the flap 37 is driven into rotation until the flow path is blocked.

When in the reverse thrust position shown in FIG. 13, the bypass cascades 38 are wholly exposed and the flaps 37 act as baffles to the flow in the duct. The stresses exerted by the flow pressure on the flaps 37 are absorbed by the linkrods 48.

As illustrated in the embodiment shown in FIG. 16 for the forward-thrust position, the displaceable cowling portion 33 is modified front and rear in a manner to cooperate with a front rest 56 and a rear rest 57. The rests are firmly affixed to the thrust-reverser's stationary structure. These rests 56 and 57 allow for absorption of the pressure stresses applied to the displaceable cowling portion 33. The configuration of the front and rear seals 135 and 136 respectively also is modified in this design. In the shown embodiment, the front seals 135 seal over a smaller radius than the rear seal 136, and as a result, the displaceable cowling portion 33 is made self-closing on account of the pressure stresses.

In a variation of the thrust reverser of the invention fitted with bypass cascades and shown in FIGS. 17–21, the flaps 137 are modified to have a constant thickness. This design allows increasing rigidity and improving structural strength of these flaps 137. Moreover the acoustic surface of the flaps 137 is increased, and acoustic attenuation is therefore improved. In this instance, in order to avert any interference between the flaps 137 and the inner panel 54 of the stationary, downstream cowling portion 30 during opening, a ramp 58 is configured on each flap 137 and the roller 47 rolls on this ramp 58 in order to offset the flap 137.

The embodiments above were described in relation to FIGS. 11 through 21 and exhibit a drawback in thrust-reversal operation: a sloping position in the flow path of the flaps 37 entails the flow to circulate within the subtended cavity. To improve the flow in the thrust-reversal mode, the flap must assume a more perpendicular position in a plane substantially orthogonal to the general direction of flow in the duct. For that purpose, the flap 137 comprises of two segments 237A and 237B. In the forward-thrust position as shown in FIG. 22, the flap comprises two segments, a first, front flap forming an upstream flap 237A and a second, rear flap 237B forming a downstream flap. The displaceable cowling portion 33 supports the front flaps 237A by means of the fittings 240 while the rear flaps 237B are connected by a linkrod 59 to a front flap 237A and by an arm 60 to the support fitting 240. In a reverse thrust position, the rear flap 237B is arranged outside the flow and to the rear of the front flap 237A which assumes a position which is less inclined inside the duct.

As shown by FIGS. 27–30, another embodiment has a drive system that is modified to a allow reduction in aerodynamic losses by the elimination of the linkrods 48 guiding the flaps in the fluid flow path. For that purpose, the linkrods 348 are situated inside the downstream cowling portion 30. Each linkrod 348 hinges at one end on a flap 337 with the insertion of a torsion spring 61. The other end of the linkrod 348 bears a roller 62 rolling within a slot 63 in the downstream cowling portion 30. The contour of the slots 63 is selected so that desired kinematics are constrained on the flap 337, in particular offsetting it at the beginning of opening as shown in FIG. 28. Another advantage of this design is the simplification in building the inside duct wall by eliminating the small ends of the linkrods.

The notches 64 arranged on the flaps 37 preclude interference between flaps during displacement and prevent the drawback of aerodynamic losses in the forward thrust position. To circumvent this difficulty, another embodiment, shown in FIGS. 31–34, uses different kinematics on every second flap. In this instance, the drive system for every second flap is mutually offset, namely the linkrods 448A and 448B, the slots 163A and 163B, and the hinges on the support fittings. As a result, the two flaps 437A and 437B assume mutually offset positions during the full time of opening.

We claim:

1. A thrust reverser for a turbojet engine having a cowling defining a downstream external fan cowling and forming an outer boundary of a gas flow duct through which gases flow from a stationary upstream cowling portion to a stationary downstream cowling portion, the cowling having at least one reverse thrust opening between the upstream cowling portion and the downstream cowling portion and communicating with the gas flow duct, the thrust reverser having a plurality of displaceable assemblies, each displaceable assembly comprising:

a displaceable cowling portion;

a flap pivotally attached at an upstream portion to one end of a bracket, said bracket being rigidly attached at another end to an upstream portion of said displaceable cowling portion;

a plurality of rolling elements supported at the upstream edge of the downstream cowling portion;

a set of flow deflecting vane-cascades subtending said reverse thrust opening;

wherein said displaceable assembly is moveable between a forward position wherein the displaceable cowling portion and the flap each subtend the upstream and downstream cowling portions such that said displaceable cowling portion forms a portion of the external fan cowling and the flap forms a portion of the outer boundary of the gas flow, and a reverse thrust position wherein the reverse thrust opening is uncovered and the displaceable cowling portion and the flap are displaced downstream such that said displaceable cowling portion extends downstream, parallel to the longitudinal engine axis and without interfering with said downstream cowling portion, and said flap engages in rolling contact with said rolling elements when said flap moves between the forward thrust position and the reverse thrust position and pivots so as to block the gas flow duct and redirect the gas flow outward though the vane-cascades.

2. The thrust reverser as claimed in claim 1, wherein every other flap is arranged with a notched, downstream corner so as to prevent any interference with said downstream cowling portion when said thrust reverser is in a reverse thrust position.

3. The thrust reverser as claimed in claim 1 wherein a linkrod is attached to said flap on a surface forming part of the outer boundary of said gas flow at one end, and slidably attached at another end to a slotted bracket mounted and located below a surface forming the inner boundary of said annular duct.

4. The thrust reverser as claimed in claim 1 wherein the displaceable cowling portion is supported by a front rest mounted on said forward cowling portion at a location adjacent to said reverse thrust opening, and by a rear rest located at an end of said downstream cowling portion adjacent to said reverse thrust opening.

5. The thrust reverser as claimed in claim 1 wherein the displaceable cowling portion has a front seal located at an upstream end and having a smaller radius than a rear seal located at a downstream end of said downstream, said front and rear seals being arranged so as to seal said downstream cowling portion in the forward thrust position.

6. The thrust reverser as claimed in claim 1 wherein the flap has a constant thickness and a ramp, said ramp being attached to a flap surface opposite to said flap surface forming a portion outer boundary of said annular duct, and arranged to engage in rolling contact with said at least one rolling element so as to offset the trajectory of the flap when said displaceable assembly moves from a forward thrust position to a reverse thrust position.

7. The thrust reverser as claimed in claim 1 wherein said flap comprises two segments including an upstream segment being pivotally attached to said bracket and to a linkrod pivotally attached to a surface forming an inner boundary of said gas flow duct, and a downstream segment being juxtaposed between said upward segment and said downstream cowling portion in the forward thrust position, said downstream segment being rigidly connected to an arm pivotally connected to said bracket and also being pivotally connected to another linkrod pivotally attached to said forward flap so that in a reverse thrust position said downstream segment extends downstream so as to permit said upstream segment to extend substantially perpendicularly to said gas flow.

8. The thrust reverser as claimed in claim 1 wherein said flap is pivotally connected to one end of a linkrod located near a downstream end of said flap and having a torsion spring which urges said flap near said linkrod, said linkrod also having another end having a rolling element that is in communication with a longitudinal slot rigidly attached to said downstream cowling portion, wherein in the forward thrust position, said rolling element is located at an upstream end of said longitudinal slot, and when moving between the forward thrust position and the reverse thrust position, said rolling element travels downstream so as to prevent interference with said downstream cowling portion when said flap moves into a reverse thrust position.

9. The thrust reverser as claimed in claim 1 wherein every second displaceable assembly has a flap that is adjacent to and overlaps a flap of a first displaceable assembly and a flap of a third displaceable assembly in the forward thrust position, and in the reverse thrust position said first, second and third flaps are mutually offset and move from the forward thrust position to the reverse thrust position without interference.

* * * * *